(12) United States Patent
Garrard

(10) Patent No.: US 12,136,855 B2
(45) Date of Patent: Nov. 5, 2024

(54) ROTATING MACHINE INCLUDING AN IMPELLER WHEEL, AND AT LEAST ONE TARGET ELEMENT AND AT LEAST ONE SENSOR TO DETERMINE ANGULAR POSITION OF THE IMPELLER WHEEL

(71) Applicant: BorgWarner Inc., Auburn Hills, MI (US)

(72) Inventor: Tyler Ransom Garrard, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 629 days.

(21) Appl. No.: 17/284,185

(22) PCT Filed: Oct. 26, 2018

(86) PCT No.: PCT/US2018/057766
§ 371 (c)(1),
(2) Date: Apr. 9, 2021

(87) PCT Pub. No.: WO2020/086095
PCT Pub. Date: Apr. 30, 2020

(65) Prior Publication Data
US 2021/0336513 A1    Oct. 28, 2021

(51) Int. Cl.
*H02K 11/21*         (2016.01)
*F02B 39/10*         (2006.01)
*F02B 37/00*         (2006.01)

(52) U.S. Cl.
CPC .............. *H02K 11/21* (2016.01); *F02B 39/10* (2013.01); *F02B 37/00* (2013.01); *H02K 2211/03* (2013.01)

(58) Field of Classification Search
CPC ........ G01D 5/12; G01D 5/145; G01D 5/2451; G01B 7/30; H02K 11/215; H02K 11/21;
(Continued)

(56) References Cited

U.S. PATENT DOCUMENTS

| | | | | |
|---|---|---|---|---|
| 3,867,656 A | * | 2/1975 | Mitsui | H02K 29/08 310/68 R |
| 4,322,666 A | * | 3/1982 | Muller | H02K 29/08 318/400.41 |

(Continued)

FOREIGN PATENT DOCUMENTS

| | | |
|---|---|---|
| DE | 69727230 T2 | 12/2004 |
| EP | 0223109 A1 | 5/1987 |

(Continued)

OTHER PUBLICATIONS

International Search Report for Application No. PCT/US2018/057766 dated Jun. 25, 2019, 4 pages.

(Continued)

*Primary Examiner* — Maged M Almawri
(74) *Attorney, Agent, or Firm* — Howard & Howard Attorneys PLLC

(57) ABSTRACT

A rotating machine includes a machine housing defining a housing interior, a shaft disposed in the housing interior, with the shaft having a length and an axis extending along the length. The shaft is rotatable about the axis. The rotating machine also includes an impeller wheel disposed in the housing interior and coupled to and rotatable by the shaft, with the impeller wheel having an angular position with respect to the axis. The rotating machine further includes a backplate coupled to the machine housing and having a first side facing the impeller wheel, at least one target element coupled to and rotatable with the impeller wheel, a circuit board coupled to the first side of the backplate and facing the impeller wheel, and at least one sensor disposed on the circuit board for detecting the at least one target element to determine the angular position of the impeller wheel.

20 Claims, 11 Drawing Sheets

(58) Field of Classification Search
CPC ......... H02K 11/20–28; H02K 2211/03; F02B 39/10; F02B 37/00
USPC ................ 310/68 A, 68 B, 68 R; 324/207.2, 324/207.25; 73/514.31
See application file for complete search history.

(56) References Cited

U.S. PATENT DOCUMENTS

| | | | | |
|---|---|---|---|---|
| 4,701,650 | A * | 10/1987 | Maemine | G01P 3/487 310/171 |
| 4,924,674 | A | 5/1990 | Hara et al. | |
| 4,935,656 | A * | 6/1990 | Kawamura | H02K 1/2733 310/156.08 |
| 5,637,945 | A * | 6/1997 | Yamamuro | H02K 29/08 310/68 B |
| 5,654,600 | A * | 8/1997 | Nomura | H02K 11/215 310/68 B |
| 5,717,268 | A * | 2/1998 | Carrier | G01P 3/487 310/67 R |
| 5,796,195 | A * | 8/1998 | Miyakawa | B60K 6/485 310/67 R |
| 5,870,894 | A | 2/1999 | Woollenweber et al. | |
| 6,013,961 | A * | 1/2000 | Sakamaki | F16D 1/0835 310/68 B |
| 6,242,826 | B1 * | 6/2001 | Saito | G11B 17/03 |
| 6,680,553 | B1 * | 1/2004 | Takano | H02K 29/08 310/68 B |
| 6,896,494 | B2 * | 5/2005 | Sunaga | F04D 13/064 417/423.1 |
| 6,954,014 | B2 * | 10/2005 | Ohiwa | G01P 3/487 310/155 |
| 7,075,290 | B2 * | 7/2006 | Collier-Hallman | G01P 3/489 324/225 |
| 7,112,958 | B2 * | 9/2006 | Yamada | F02B 39/10 324/207.25 |
| 7,518,273 | B2 * | 4/2009 | Kataoka | H02K 29/08 310/68 B |
| 7,686,516 | B2 * | 3/2010 | Shibasaki | G01P 3/488 324/207.25 |
| 8,029,252 | B2 | 10/2011 | Noelle | |
| 8,562,313 | B2 * | 10/2013 | Andersen | H02K 3/522 310/43 |
| 8,816,677 | B2 * | 8/2014 | LaCroix | G01D 5/145 324/207.25 |
| 9,450,476 | B2 * | 9/2016 | Ito | H02K 11/38 |
| 9,577,489 | B2 * | 2/2017 | Collins | H02K 1/185 |
| 9,667,124 | B2 * | 5/2017 | Utsumi | H02K 15/0006 |
| 9,735,658 | B2 * | 8/2017 | Woo | H02K 11/215 |
| 9,879,681 | B2 * | 1/2018 | Stentoft | F04D 13/064 |
| 10,116,183 | B2 * | 10/2018 | Jacobsen | F04D 25/06 |
| 10,167,012 | B2 * | 1/2019 | Asao | H02P 25/22 |
| 10,720,811 | B2 * | 7/2020 | Hosoi | H02K 5/161 |
| 11,444,510 | B2 * | 9/2022 | Kim | H02K 5/06 |
| 2001/0015582 | A1 * | 8/2001 | Nakajima | H02K 29/08 324/207.13 |
| 2001/0045786 | A1 * | 11/2001 | Sekine | H02K 11/33 310/156.31 |
| 2002/0118011 | A1 * | 8/2002 | Wolf | G01B 7/023 324/207.2 |
| 2003/0047304 | A1 * | 3/2003 | Kasuga | H05K 1/0263 165/185 |
| 2003/0048084 | A1 * | 3/2003 | Brown | H02K 11/33 318/400.01 |
| 2005/0212366 | A1 * | 9/2005 | Yoshiyama | H02K 29/08 310/68 B |
| 2005/0217923 | A1 * | 10/2005 | Onizuka | B62D 15/0235 180/444 |
| 2007/0145839 | A1 * | 6/2007 | Kimura | H02K 29/08 310/68 B |
| 2008/0211357 | A1 * | 9/2008 | Kataoka | H02K 11/215 310/90 |
| 2009/0026860 | A1 * | 1/2009 | Ohuchi | H02K 5/08 310/71 |
| 2009/0261693 | A1 * | 10/2009 | Debraillly | F16C 35/067 310/68 B |
| 2010/0090635 | A1 * | 4/2010 | Andersen | F04D 13/0686 310/71 |
| 2010/0156216 | A1 * | 6/2010 | Lee | D06F 37/304 310/89 |
| 2010/0176695 | A1 * | 7/2010 | Tezuka | H02K 5/1732 310/68 B |
| 2011/0068661 | A1 * | 3/2011 | Clendenen | H02K 11/33 29/829 |
| 2011/0095658 | A1 * | 4/2011 | Takeuchi | G01D 5/2458 310/68 B |
| 2012/0091830 | A1 * | 4/2012 | Kim | H02K 11/215 310/43 |
| 2012/0229127 | A1 * | 9/2012 | Koto | G01D 5/2452 324/207.25 |
| 2013/0010426 | A1 * | 1/2013 | Nakano | H02K 11/33 361/690 |
| 2013/0026888 | A1 * | 1/2013 | Migita | H02K 29/08 310/68 B |
| 2013/0057095 | A1 * | 3/2013 | Okinaga | H02K 5/225 310/71 |
| 2013/0140963 | A1 * | 6/2013 | Yoshidomi | H02K 11/22 310/68 B |
| 2014/0091683 | A1 * | 4/2014 | Ito | B62D 5/0406 310/68 R |
| 2014/0134012 | A1 * | 5/2014 | Cho | F04D 17/16 417/354 |
| 2014/0265748 | A1 * | 9/2014 | Clendenen | H02K 11/33 310/68 R |
| 2016/0079825 | A1 * | 3/2016 | Sawada | H02K 5/225 310/43 |
| 2017/0015279 | A1 | 1/2017 | Rosas et al. | |
| 2017/0201148 | A1 * | 7/2017 | Haga | H02K 5/225 |
| 2019/0296601 | A1 * | 9/2019 | Yamaguchi | H02K 5/225 |
| 2021/0336513 | A1 * | 10/2021 | Garrard | F04D 27/001 |

FOREIGN PATENT DOCUMENTS

| | | |
|---|---|---|
| EP | 0310426 A2 | 4/1989 |
| EP | 0215377 B1 | 7/1991 |
| EP | 3157142 A1 | 4/2017 |
| FR | 2568377 A1 | 1/1986 |
| GB | 2531212 B | 3/2017 |
| JP | S62142824 A | 6/1987 |
| JP | S62194466 A | 8/1987 |
| JP | H01092530 A | 4/1989 |
| JP | H0132098 B2 | 6/1989 |
| JP | H0579340 A | 3/1993 |
| JP | 2014206067 A | 10/2014 |
| WO | 2013/122859 A1 | 8/2013 |

OTHER PUBLICATIONS

English language abstract and machine-assisted English translation for EP 0 223 109 A1 extracted from espacenet.com database on Apr. 19, 2021, 8 pages.

English language abstract and machine-assisted English translation for FR 2 568 377 A1 extracted from espacenet.com database on Apr. 19, 2021, 3 pages.

English language abstract and machine-assisted English translation for JPS 62-142842 A extracted from espacenet.com database on May 3, 2021, 5 pages.

English language abstract and machine-assisted English translation for JPS 62-194466 A extracted from espacenet.com database on May 3, 2021, 4 pages.

English language abstract and machine-assisted English translation for JPH 01-092530 A extracted from espacenet.com database on May 3, 2021, 5 pages.

Machine-assisted English translation for JPH 01-32098 B2 extracted from espacenet.com database on May 3, 2021, 5 pages.

English language abstract and machine-assisted English translation for JPH 05-79340 A extracted from espacenet.com database on Apr. 19, 2021, 8 pages.

(56) References Cited

OTHER PUBLICATIONS

English language abstract for DE 697 27 230 T2 extracted from espacenet.com database on Feb. 23, 2024, 1 page.
English language abstract and machine-assisted English translation for JP 2014-206067 A extracted from espacenet.com database on Feb. 23, 2024, 12 pages.

* cited by examiner

ROTATING MACHINE INCLUDING AN IMPELLER WHEEL, AND AT LEAST ONE TARGET ELEMENT AND AT LEAST ONE SENSOR TO DETERMINE ANGULAR POSITION OF THE IMPELLER WHEEL

CROSS-REFERENCE TO RELATED APPLICATIONS

The present application is the National Stage of International Patent Application No. PCT/US2018/057766 filed on Oct. 26, 2018, which is hereby expressly incorporated herein by reference in its entirety.

BACKGROUND OF THE INVENTION

1. Field of the Invention

The present invention relates generally to a rotating machine and, more specifically, to a turbocharger.

2. Description of the Related Art

Rotating machines, such as turbochargers, are used in various applications, such as vehicles, heavy equipment, diesel engines, motors, and the like. Typical rotating machines include a machine housing defining a housing interior, a shaft disposed in the housing interior and rotatable about an axis, with the shaft having an angular position with respect to the axis, and an impeller wheel disposed in the housing interior and coupled to and rotatable by the shaft. The impeller wheel may receive exhaust gas from an internal combustion engine, or may deliver compressed air to an internal combustion engine.

During operation of the rotating machine, determining the angular position of the shaft is often desired for control purposes of the rotating machine. To obtain angular position of the shaft, the rotating machine may use various sensing systems, such as a position sensor, for determining angular position of the shaft. However, current sensing systems used in conventional rotating machines are not compact, disrupt airflow/exhaust flow, and are expensive. As such, there remains a need for an improved rotating machine.

Some rotating machines may also include an electric assembly, with the electric assembly including a rotor coupled to the shaft, and a stator disposed about the rotor for receiving electrical energy to rotate the shaft and, in turn, to transmit torque to and from the shaft, and/or for producing electrical energy when the impeller wheel rotates the shaft. In such applications, the rotating machine may use a sensing system, such as a position sensor, or may use the Back Electromotive Voltage (BEMF) of the stator to determine the angular position of the shaft during rotation of the shaft. When using sensorless operation, a controller detects the voltage generated from the rotor rotating with the shaft within the stator. The voltage is then used to determine the angular position of the shaft, which the controller then uses to either increase or decrease the current to the stator to control the rotational speed of the shaft. However, in such applications, it is difficult to accurately determine the angular position of the shaft during low and high rotational speeds of the shaft, which can result in inaccurate angular position information of the shaft being provided to the controller. Specifically, because BEMF voltage is proportional to the rotational speed of the shaft, during low rotational speeds, the voltage reading is nominal and often in millivolts, which often results in an inaccurate angular position reading of the shaft. During high rotational speeds of the impeller wheel and, in turn, the rotor, the electric assembly operates above a bus voltage saturation level. In such instances, field weakening is used to suppress the voltage generated from the electric assembly. However, such field weakening reduces the ability to sense the rotor position from the BEMF. Furthermore, high acceleration rates of the impeller wheel and, in turn, the rotor, are a result of high current, which results in voltage saturation where sensing the angular position of the rotor becomes increasingly difficult. As such, there remains a need for an improved rotating machine including the electric assembly including an improved sensing system.

Determining angular position of the shaft in the rotating machine is particularly important in certain rotating machines, such as a turbocharger. Impeller wheels and the shaft of the turbocharger often can exceed 350,000 RPM. Additionally high acceleration rates are also common in excess of 37,000 radians per second per second. In such applications, the turbocharger may include various sensing systems, such as a position sensor, an encoder, or a resolver to determine the angular position of the shaft. However, such sensing systems are not compact, disrupt airflow/exhaust flow, are expensive, and are difficult to place in the turbocharger because there are no free ends in most turbochargers or areas that do not disrupt flow. Additionally, sensing systems located on the turbine side are subject to extreme heat, and sensing systems on the compressor side are subject to incoming airflow. As such, there remains a need for an improved turbocharger including an improved sensing system.

Some turbochargers include the electrical assembly described above. In such turbochargers, the turbocharger may use a sensing system or the voltage of the stator to determine the angular position of the shaft during rotation of the shaft. Specifically, when using the voltage of the stator, the turbocharger detects the voltage generated from the rotor rotating within the stator. The BEMF voltage of the stator is then used to determine the angular position of shaft, which is then communicated to a controller to either increase or decrease the current to the stator to control the angular position of the shaft and, in turn, the rotational speed of the shaft. However, when using the BEMF of the stator to determine the angular position of the shaft, it is difficult to accurately determine the angular position of the shaft during low and high rotational speeds of the shaft, which can result in inaccurate angular position reading of the shaft being provided to the controller. Specifically, during low rotational speeds, the because the BEMF voltage is proportional to the rotational speed of the shaft, the voltage reading is nominal and often in millivolts, which often results in an inaccurate angular position reading of the shaft. During high rotational speeds of the shaft and, in turn, the rotor, the electric assembly operates above a bus voltage saturation level. In such instances, field weakening is used to suppress the voltage generated from the electric assembly. However, such field weakening reduces the ability to sense the rotor position from the BEMF. Furthermore, high acceleration rates of the impeller wheel and, in turn, the rotor, are a result of high current, which results in voltage saturation where sensing the angular position of the rotor becomes increasingly difficult. As such, there remains a need for an improved turbocharger including the electric assembly including an improved sensing system.

SUMMARY OF THE INVENTION AND ADVANTAGES

A rotating machine includes a machine housing defining a housing interior, a shaft disposed in the housing interior, with the shaft having a length and an axis extending along the length. The shaft is rotatable about the axis. The rotating machine also includes an impeller wheel disposed in the housing interior and coupled to and rotatable by the shaft, with the impeller wheel having an angular position with respect to the axis. The rotating machine further includes a backplate coupled to the machine housing and having a first side facing the impeller wheel and a second side opposite the first side and facing away from the impeller wheel. The rotating machine additionally includes at least one target element coupled to and rotatable with the impeller wheel, a circuit board coupled to the first side of the backplate and facing the impeller wheel, and at least one sensor disposed on the circuit board for detecting the at least one target element to determine the angular position of the impeller wheel.

Accordingly, the rotating machine including the at least one target element coupled to and rotatable with the impeller wheel, the circuit board coupled to the first side of the backplate and facing the impeller wheel, and at least one sensor disposed on the circuit board for detecting the at least one target element to determine the angular position of the impeller wheel allows a more compact rotating machine, does not disrupt exhaust/airflow, and is less expensive than conventional rotating machines.

BRIEF DESCRIPTION OF THE DRAWINGS

Other Advantages of the Present Invention Will be Readily Appreciated, as the Same Becomes Better Understood by Reference to the Following Detailed Description when Considered in Connection with the Accompanying Drawings Wherein.

DETAILED DESCRIPTION OF THE INVENTION

Figure 1:
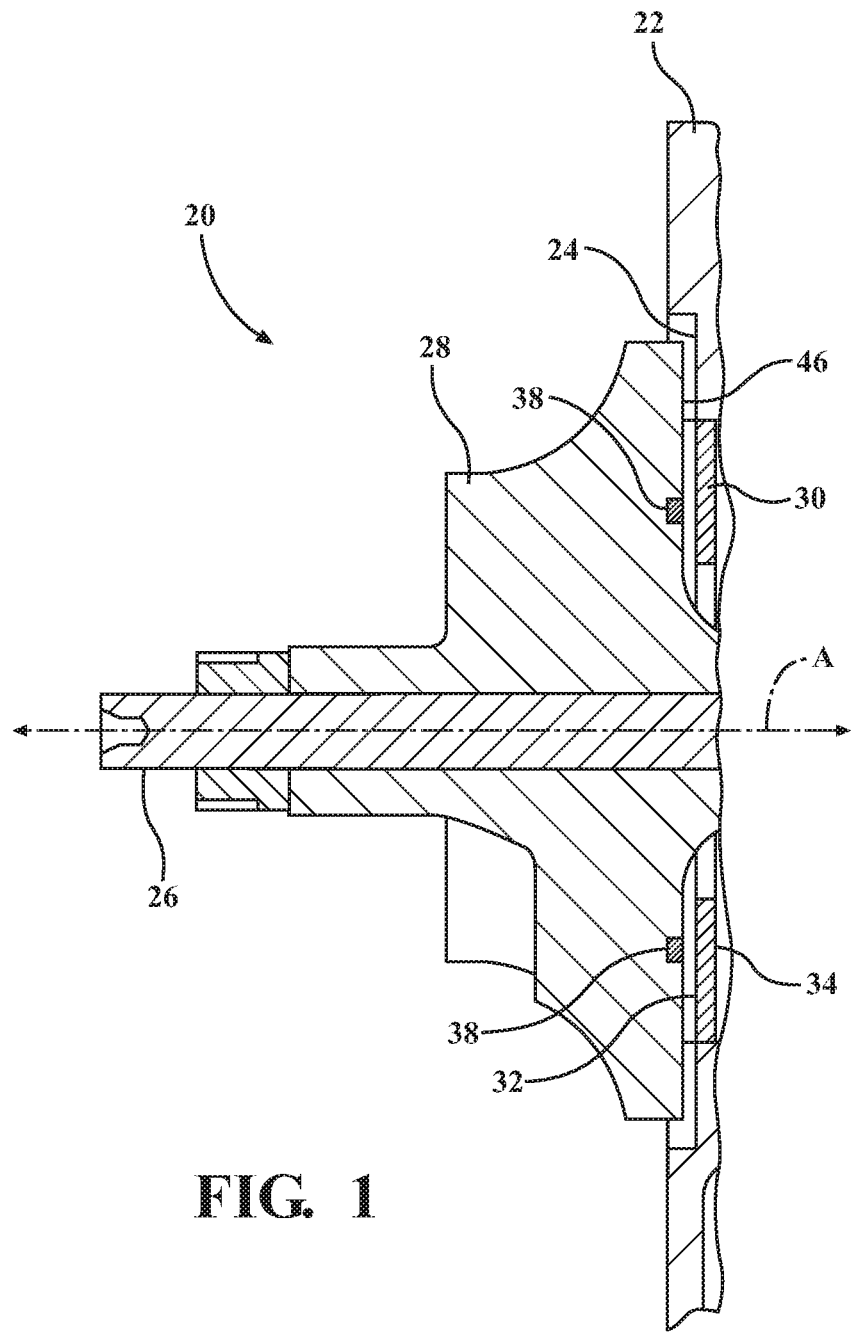
FIG. 1 is a cross-sectional view of a rotating machine, with the rotating machine including a machine housing, a shaft having a length and an axis extending along the length, an impeller wheel, a backplate, and at least one target element coupled to and rotatable with said impeller wheel.

With reference to the Figures, wherein like numerals indicate like parts throughout the several views, a rotating machine 20 is shown in cross-sectional view in FIG. 1. The rotating machine 20 may be used in vehicles, heavy equipment, diesel engines, motors, turbo-compound engines, and the like, and particularly in high rotational speed applications. The rotating machine 20 may be an electric compressor, such as an eBooster®, as described in further detail below. The rotating machine 20 may be a turbocharger, as described in further detail below. The rotating machine 20 may be an electrified turbocharger, such as an eTurbo, as described in further detail below. The rotating machine 20 includes a machine housing 22 defining a housing interior 24. The rotating machine 20 includes a shaft 26 disposed in the housing interior 24, with the shaft 26 having a length L and an axis A extending along the length L, and with the shaft 26 being rotatable about the axis A. The rotating machine 20 also includes an impeller wheel 28 disposed in the housing interior 24 and coupled to and rotatable by the shaft 26, with the impeller wheel 28 having an angular position with respect to the axis A. It is to be appreciated that the angular position of the impeller wheel 28 is typically the same as the angular position of the shaft 26, as the impeller wheel 28 is rotatably coupled to the shaft 26 such that the impeller wheel 28 and the shaft 26 rotate at the same rotational speed. Although the impeller wheel 28 is shown in FIG. 1 with a nut coupling the impeller wheel 28 and the shaft 26, it is to be appreciated that the impeller wheel 28 may be coupled to the shaft 26 without the use of the nut, and that the impeller wheel 28 may be, for example, integral with the shaft 26.

Figure 3:
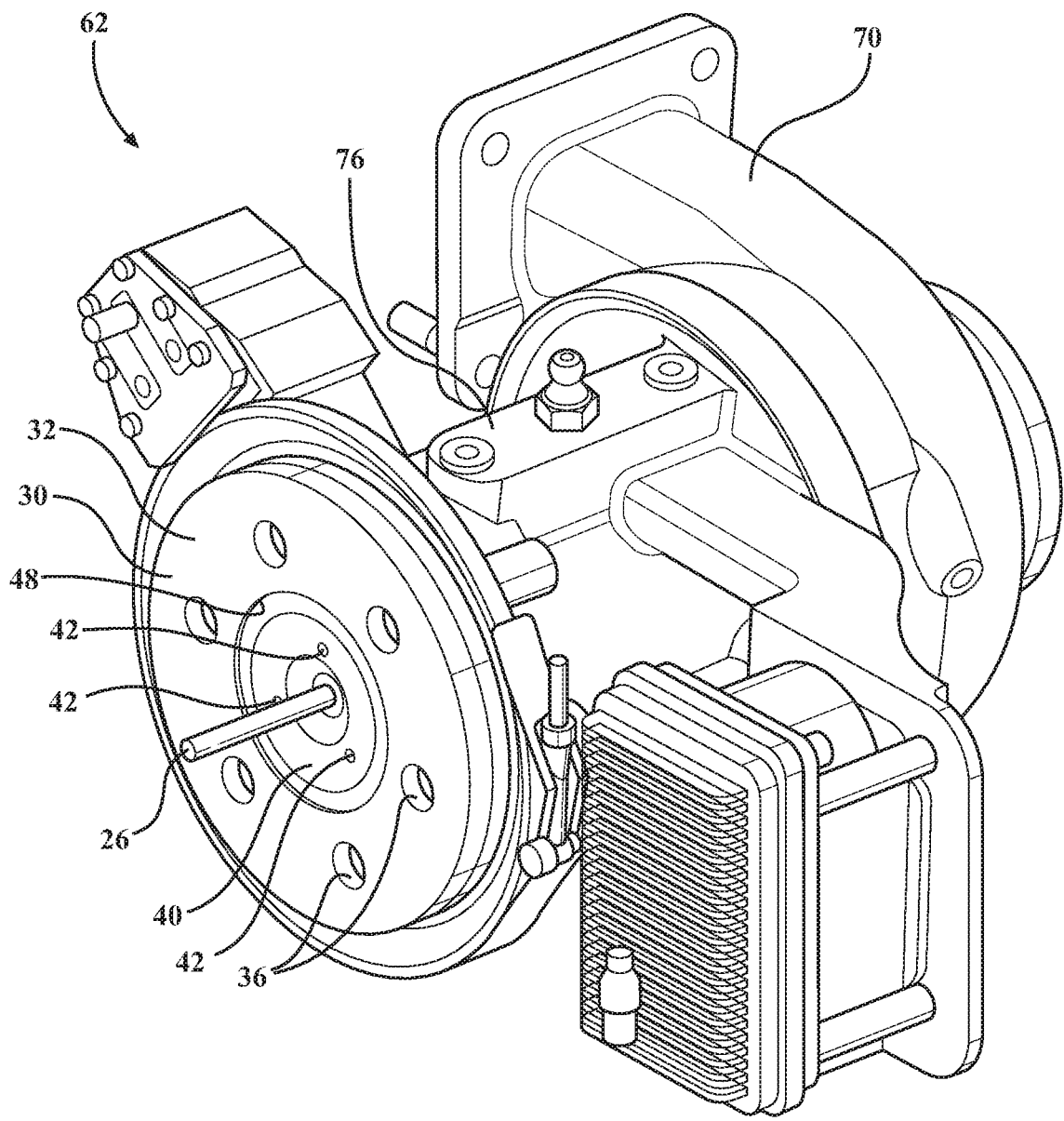
FIG. 3 is perspective view of the turbocharger, with the compressor housing removed to show the backplate, a circuit board coupled to the backplate, and at least one sensor disposed on the circuit board, with the backplate having a first side facing the impeller wheel, with the first side having a first backplate surface defining a backplate cavity, and with the circuit board being disposed in the backplate cavity.

The rotating machine 20 further includes a backplate 30 coupled to the machine housing 22 and having a first side 32 facing the impeller wheel 28 and a second side 34 opposite the first side 32 and facing away from the impeller wheel 28. The backplate 30 may be coupled to the machine housing 22 in any suitable manner. For example, as best shown in FIG. 3, the backplate 30 may define a plurality of mounting holes 36 for receiving a fastener for coupling the backplate 30 to the machine housing 22. In some embodiments, the machine housing 22 may define a slot with the backplate 30 disposed within the slot. In another embodiment, the backplate 30 is integral with the machine housing 22.

The rotating machine 20 also includes at least one target element 38 coupled to and rotatable with the impeller wheel 28, a circuit board 40 coupled to the first side 32 of the backplate 30 and facing the impeller wheel 28, and at least one sensor 42 disposed on the circuit board 40 for detecting the at least one target element 38 to determine the angular position of the impeller wheel 28. It is to be appreciated that to determine the angular position of the impeller wheel 28, the at least one target element 38 and the at least one sensor 42 of the rotating machine 20 includes at least one target element 38 and at least two sensors 42, or includes at least two target elements 38 and at least one sensor 42.

The rotating machine 20 including the at least one target element 38 coupled to and rotatable with the impeller wheel 28, the circuit board 40 coupled to the first side 32 of the backplate 30 and facing the impeller wheel 28, and the at least one sensor 42 disposed on the circuit board 40 for detecting the at least one target element 38 to determine the angular position of the impeller wheel 28 provides a more compact rotating machine 20. The at least one target element 38, the circuit board 40 coupled to the first side 32 of the backplate 30 facing the impeller wheel 28, and the at least one sensor 42 disposed on the circuit board 40 may be entirely disposed in the housing interior 24. The at least one target element 38 coupled to and rotatable with the impeller wheel 28, the circuit board 40 coupled to the first side 32 of the backplate 30 facing the impeller wheel 28, and the at least one sensor 42 disposed on the circuit board 40 does not disrupt exhaust/airflow through the rotating machine 20. Specifically, having the circuit board 40 coupled to the first side 32 of the backplate 30 facing the impeller wheel 28, and having the at least one target element 38 coupled to and rotatable with the impeller wheel 28 keeps the backplate 30, the circuit board 40, and the at least one target element 38 out of the way of the flow of exhaust gas/compressed air going through the rotating machine 20. The at least one target element 38 coupled to and rotatable with the impeller wheel 28, the circuit board 40 coupled to the first side 32 of the backplate 30 facing the impeller wheel 28, and the at least one sensor 42 disposed on the circuit board 40 is less expensive than traditional rotating machines.

From the angular position of the impeller wheel 28, the rotating speed of the impeller wheel 28 and, in turn, the shaft 26 may be determined. The rotating machine 20 may be free of a speed sensor, as the angular position measurement may be communicated to a controller 43, which may then calculate rotational speed of the impeller wheel 28.

Figure 11:
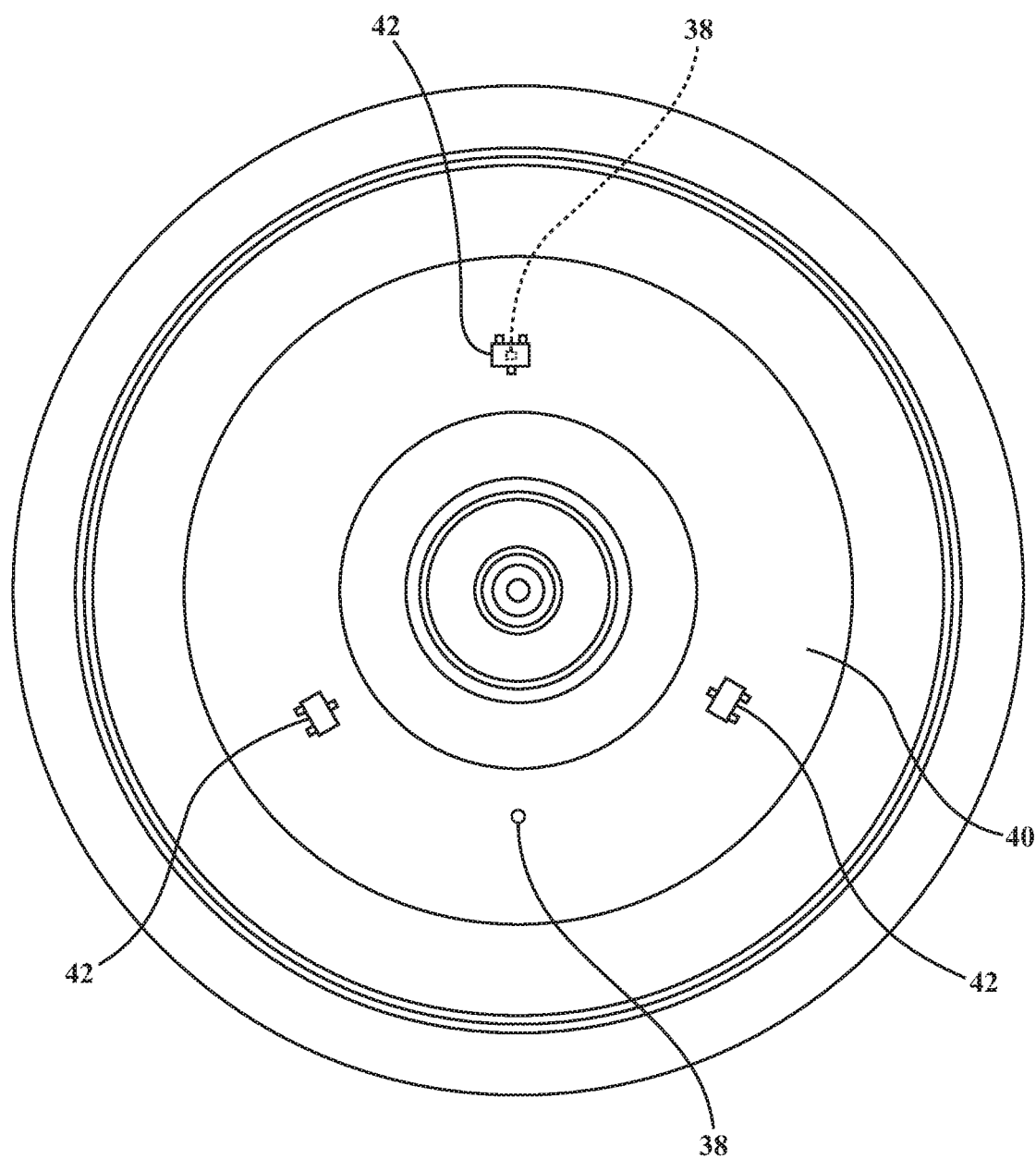
FIG. 11 is a front view of the circuit board coupled to the backplate and showing the target element passing by the sensor.

In one embodiment, the at least one sensor 42 may be further defined as two sensors. In yet another embodiment, the at least one sensor 42 may be further defined as three sensors. It is to be appreciated that the at least one sensor 42 may be further defined as any number of suitable sensors, such as four sensors, five sensors, or six sensors. When there is more than one sensor 42, the sensors 42 may be concentric and equally radially spaced about the axis A, as best shown in FIG. 11. When there is more than one sensor 42 and the sensors 42 are concentrically and equally radially spaced about the axis, the at least one target element 38 passes by more than one sensor during one rotation of the impeller wheel 28. Additionally, depending on the number of sensors 42 on the circuit board 40, the angular position of the impeller wheel 28 can be determined based on the number of sensors 42. For example, if two sensors 42 are used and a single target element 38 is used, the angular position of the impeller wheel 28 may be determined within 180 degree accuracy; if three sensors 42 are used and a single target element 38 is used, the angular position of the impeller wheel 28 may be determined within 120 degree accuracy; if four sensors 42 are used and a single target element 38 is used, the angular position of the impeller wheel 28 may be determined within 90 degree accuracy; if five sensors 42 are used and a single target element 38 is used, the angular position of the impeller wheel 28 may be determined within 72 degrees. The sensor 42 may any suitable sensor, such as a Hall Effect sensor.

Figure 7:
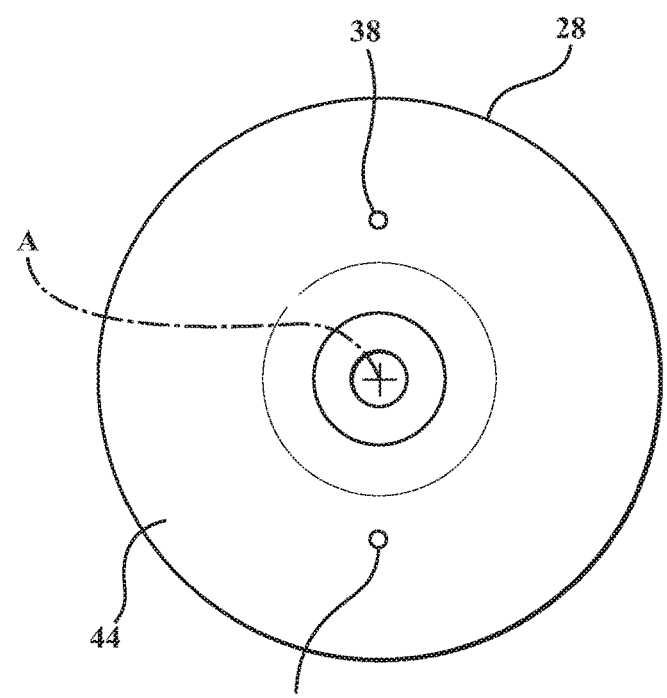
FIG. 7 is a bottom view of the impeller wheel, with the target elements being concentric and equally radially spaced about the axis.
Figure 8:
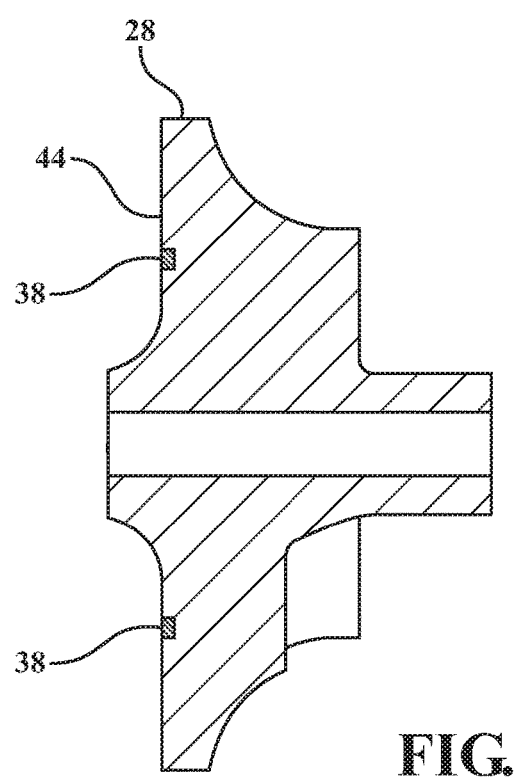
FIG. 8 is a cross-sectional view of the impeller wheel, with the target elements being embedded in the backwall surface of the impeller wheel.
Figure 9:
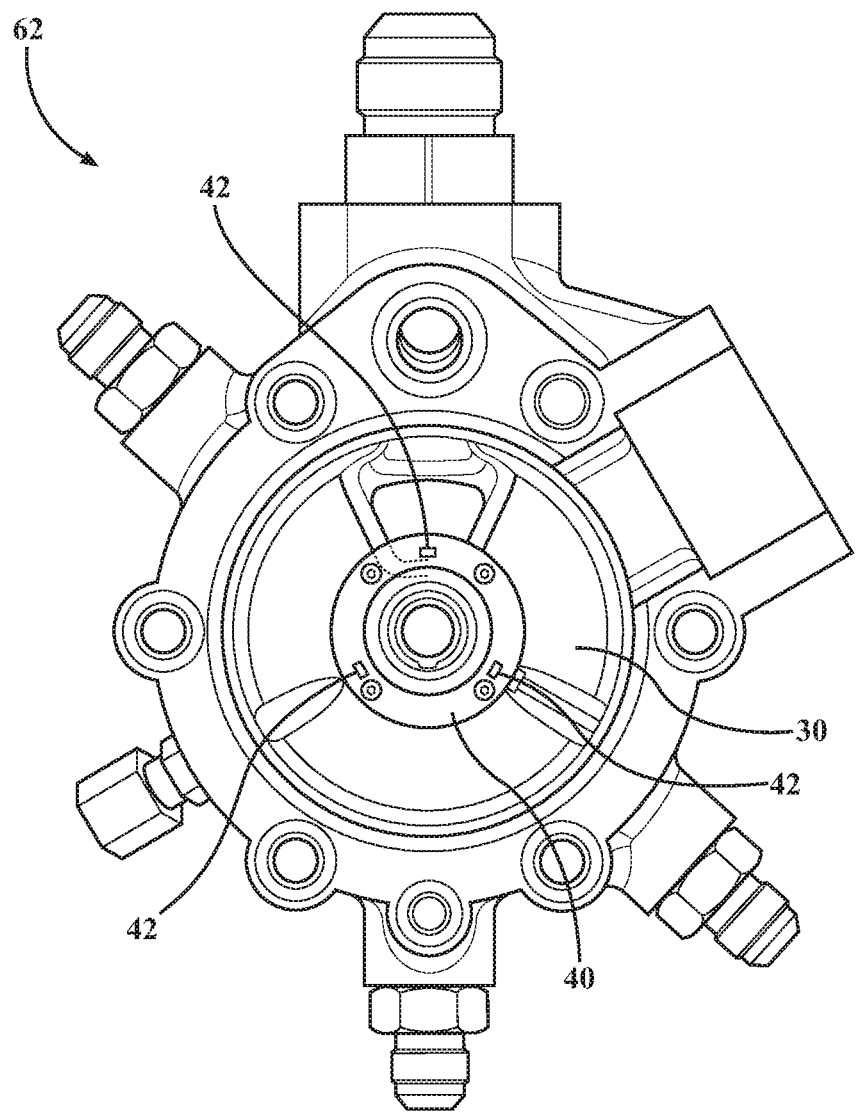
FIG. 9 is a front view of the turbocharger, with the compressor housing removed to show the circuit board coupled to the backplate and disposed in the bearing housing.
Figure 10:
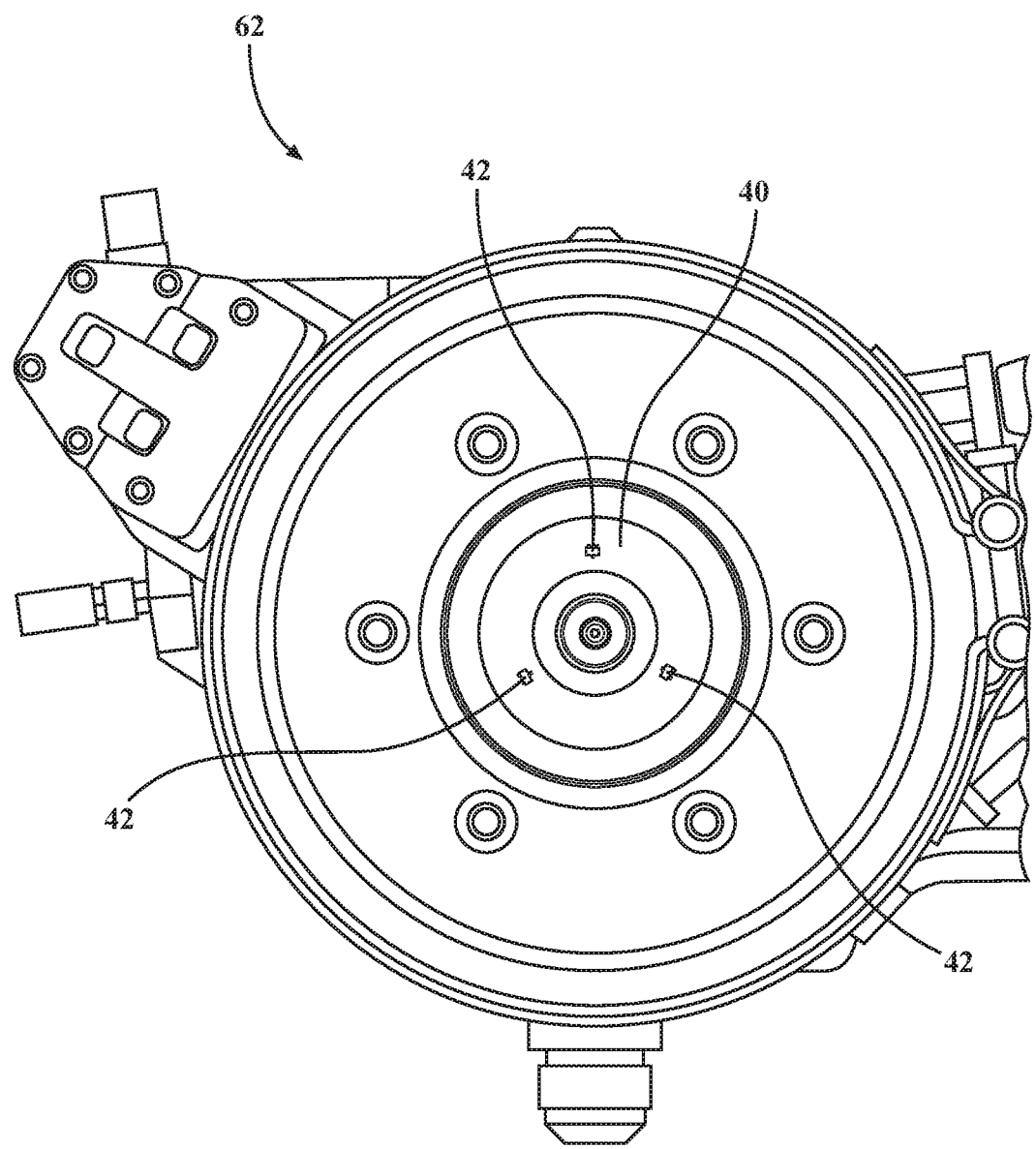
FIG. 10 a front view of the turbocharger, with the compressor housing removed, and with the backplate defining a plurality of mounting holes

The at least one target element 38 may be further defined as two target elements. It is to be appreciated that the at least one target element may be further defined as any number of suitable target elements, such as three target elements, four target elements, five target elements, or six target elements. When there is more than one target element 38, the target elements 38 may be concentric and equally radially spaced about the axis A, as best shown in FIG. 7. For example, when two target elements 38 are coupled to and rotatable with the impeller wheel 28, the two target elements 38 may be separated 180 degrees about the axis A with respect to one another. If three target elements 38 are coupled to and rotatable with the impeller wheel 28, the three target elements 38 may be separated 120 degrees about the axis A with respect to one another. If four target elements 38 are coupled to and rotatable with the impeller wheel 28, the four target elements 38 may be separated by 90 degrees about the axis A with respect to one another. When there is more than one target element 38, having the target elements 38 concentrically and equally radially spaced about the axis A allows the mass of the impeller wheel 28 to be equally distributed about the axis A, which minimizes the effect on inertia of the impeller wheel 28. Having the mass of the impeller wheel 28 equally distributed about the axis A minimizes vibration of the shaft 26, especially in high rotational speed applications. When the at least one target element 38 is defined as two target elements 38, one target element 38 may be oriented as a north pole target element and the other of the two target elements may be oriented as a south pole target element.

Depending on the number of target elements 38, the angular position of the impeller wheel 28 can be determined based on the number of target elements 38 and the number of sensors 42. For example, if two target elements 38 are used and a single sensor 42 is used, the angular position of the impeller wheel 28 may be determined within 180 degree accuracy; if three target elements 38 are used and a single sensor 42 is used, the angular position of the impeller wheel 28 may be determined within 120 degree accuracy; if four target elements 38 are used and a single sensor 42 is used, the angular position of the impeller wheel 28 may be determined within 90 degree accuracy; if five target elements 38 are used and a single sensor 42 is used, the angular position of the impeller wheel 28 may be determined within 72 degrees.

As described above, in some embodiments more than one target element 38 may be coupled to and rotatable with the impeller wheel 28, and more than one sensor 42 may be coupled to the circuit board 40. In such embodiments, depending on the number of target elements 38 and sensors 42 present, the angular position of the impeller wheel 28 can be determined within a certain degree of accuracy. For example, with reference to FIG. 11, if two target elements 38 are present and are concentrically and equally radially spaced about the axis A, and three sensors 42 are present and are concentrically and equally radially spaced about the axis A, the angular position of the impeller wheel 28 can be determined within 60 degrees. When two target elements 38 are used and three sensors are used, the angular position of the impeller wheel 28 may be broken up into six equal segments, and the angular position of the impeller wheel 28 may be determined to be in one of the six equal segments. As described below, a measured angular impeller wheel position is compared to a predicted angular impeller wheel position by the controller 43, and the difference between the measured angular impeller wheel position and the predicted angular impeller wheel position The impeller wheel 28 may have a backwall surface 44 facing the first side 32 of the backplate 30. The at least one target element 38 may be embedded in the backwall surface 44. When the at least one target element 38 is embedded in the backwall surface 44, the at least one target element 38 may be flush with the backwall surface 44. It is to be appreciated that if two target elements 38, three target elements 38, or four target elements 38 are present, each target element 38 may be embedded in the backwall surface 44, and each target element 38 may be flush with the backwall surface 44. Having the at least one target element 38 flush with the backwall surface 44 allows for a more compact design, as the target elements 38 are not taking up any additional space in the housing interior 24. In one embodiment, the target element 38 is further defined as a magnet. In another embodiment, the target element 38 is further defined as a charged target, i.e., a component that has a magnetic charge that can be detected by the at least one sensor 42.

The first side 32 of the backplate 30 may have may have a backplate surface 46 defining a backplate cavity 48. In such embodiments, the circuit board 40 may be disposed in the backplate cavity 48, as best shown in FIG. 3. When the circuit board 40 is disposed in the backplate cavity 48, the circuit board 40 may be flush with the first side of the backplate surface 46. When the circuit board 40 is disposed in the backplate cavity 48, a more compact design of the rotating machine 20 is achieved, as the circuit board 40 is not taking up any additional space in the housing interior 24. In embodiments where the circuit board 40 is disposed in the backplate cavity 48 and the at least one target element 38 is embedded in the impeller wheel 28 an even more compact design of the rotating machine 20 may be achieved, as the first side 32 of the backplate surface 46 and backwall surface 44 are able to be closer to one another with respect to the axis A.

Figure 4:
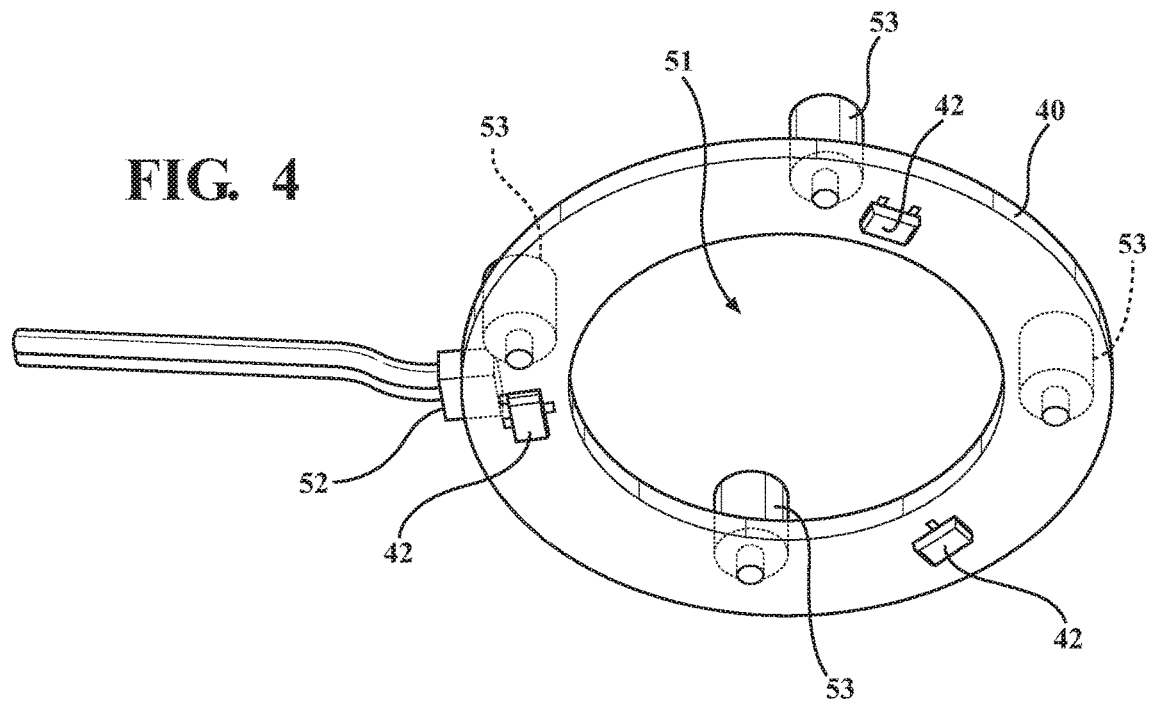
FIG. 4 is a perspective view of another embodiment of the circuit board and at least one sensor.
Figure 5:
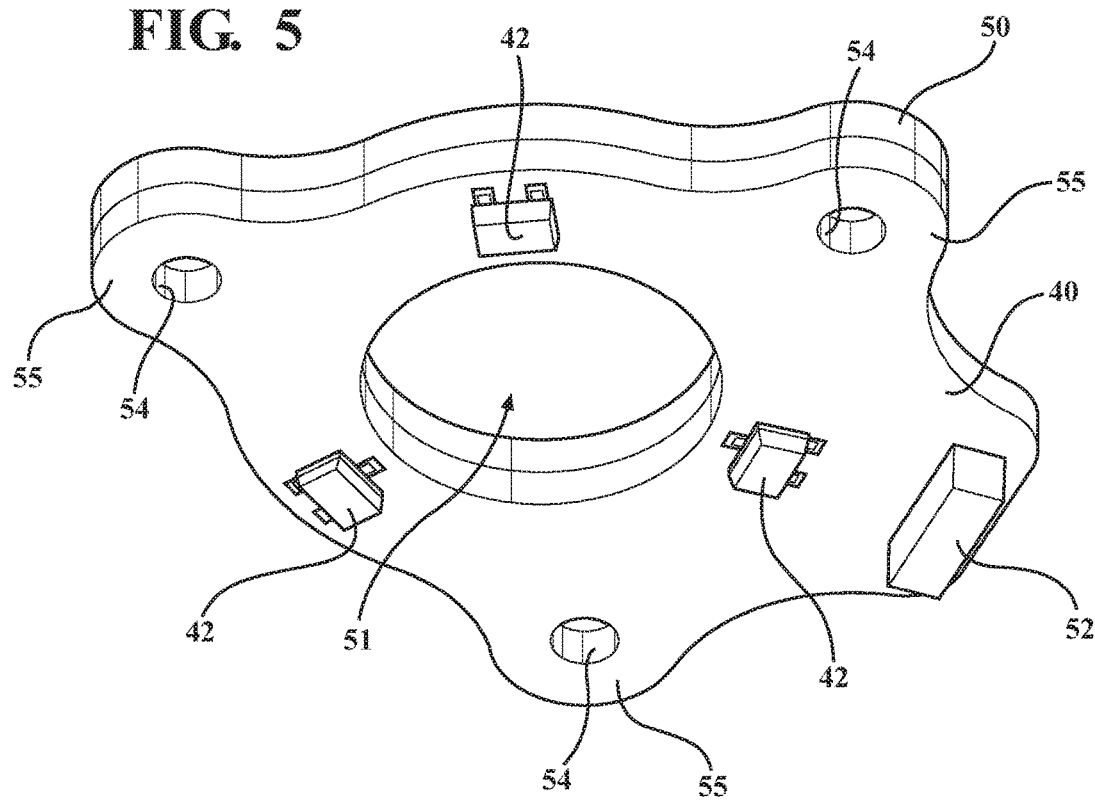
FIG. 5 is a perspective view of another embodiment of the circuit board and at least one sensor.
Figure 6:
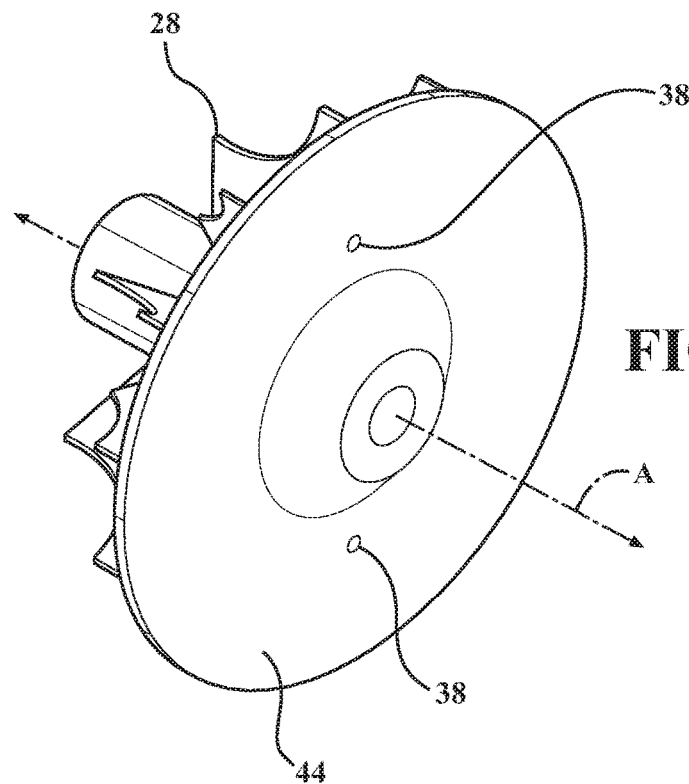
FIG. 6 is a perspective view of a backwall surface of the impeller wheel.

The rotating machine 20 may include an insulating plate 50, as shown in FIG. 5, coupled to the circuit board 40 such that the circuit board 40 is disposed between the insulating plate 50 and the impeller wheel 28. Typically, the insulating plate 50 is included in the rotating machine 20 to help insulate the circuit board 40 from extreme temperatures, such as heat produced from exhaust gas of an internal combustion engine, as described in further detail below. The rotating machine 20 may include an interface connector 52 coupled to the circuit board 40 for communicating angular position readings of the impeller wheel 28 to the controller 43. The circuit board 40 may define a plurality of holes 54 for receiving a fastener 53 to couple the circuit board 40 to the backplate 30 and, when present, the insulating plate 50. It is to be appreciated that the circuit board 40 may have any suitable configuration for being coupled to the first side 32 of the backplate 30. For example, as shown in FIG. 4, the circuit board 40 may have an annular configuration. As shown in FIG. 5, the circuit board 40 may have an annular configuration and have a plurality of projections 55 defining the plurality of holes 54. The circuit board 40 may define a shaft bore 51 for allowing the shaft 26 to extend therethrough.

Figure 12:
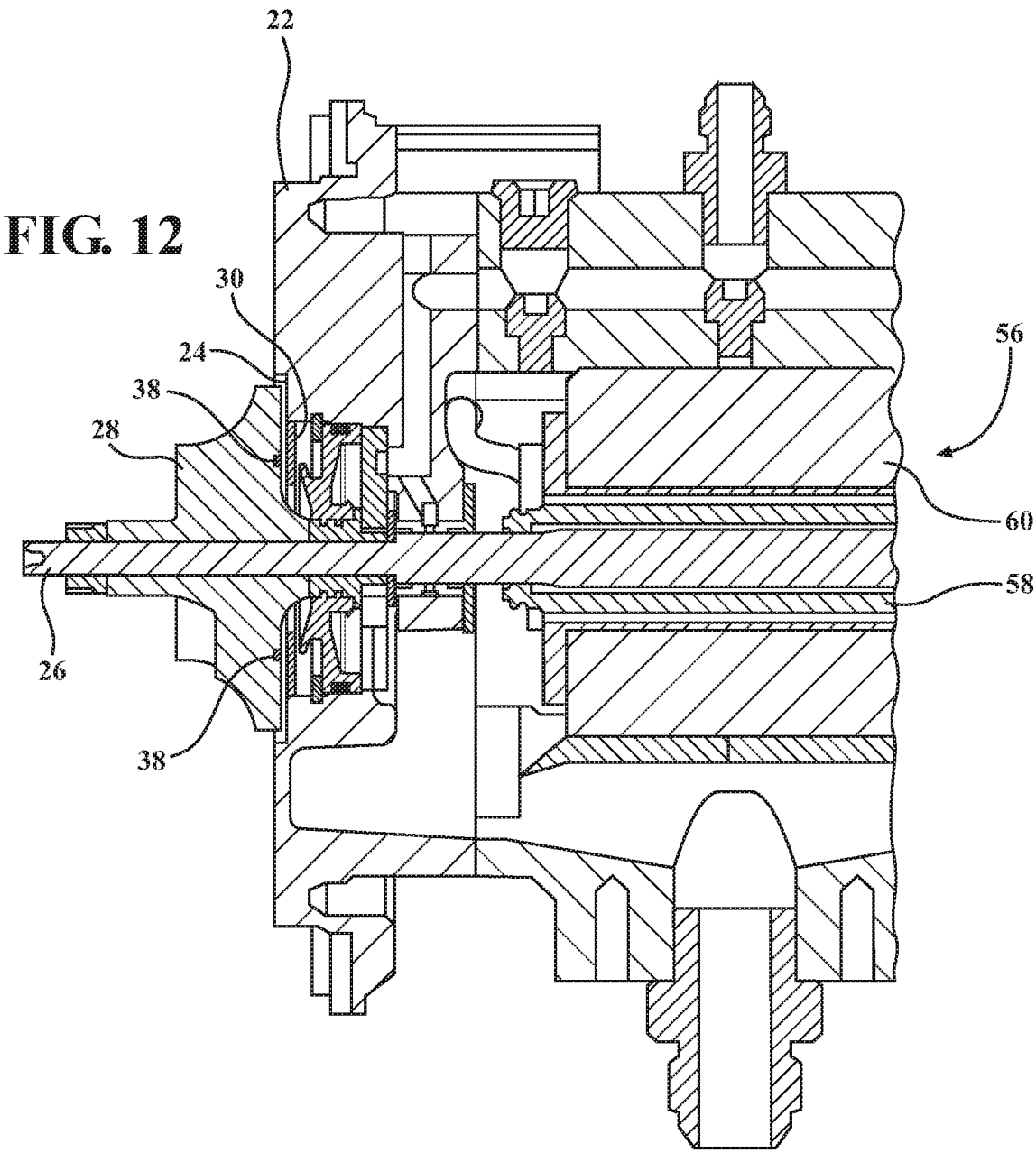
FIG. 12 is a cross-sectional view of the rotating machine including an electric assembly, with the electric assembly including a rotor coupled to the shaft for rotating with the shaft, and a stator disposed about the rotor.
Figure 13:
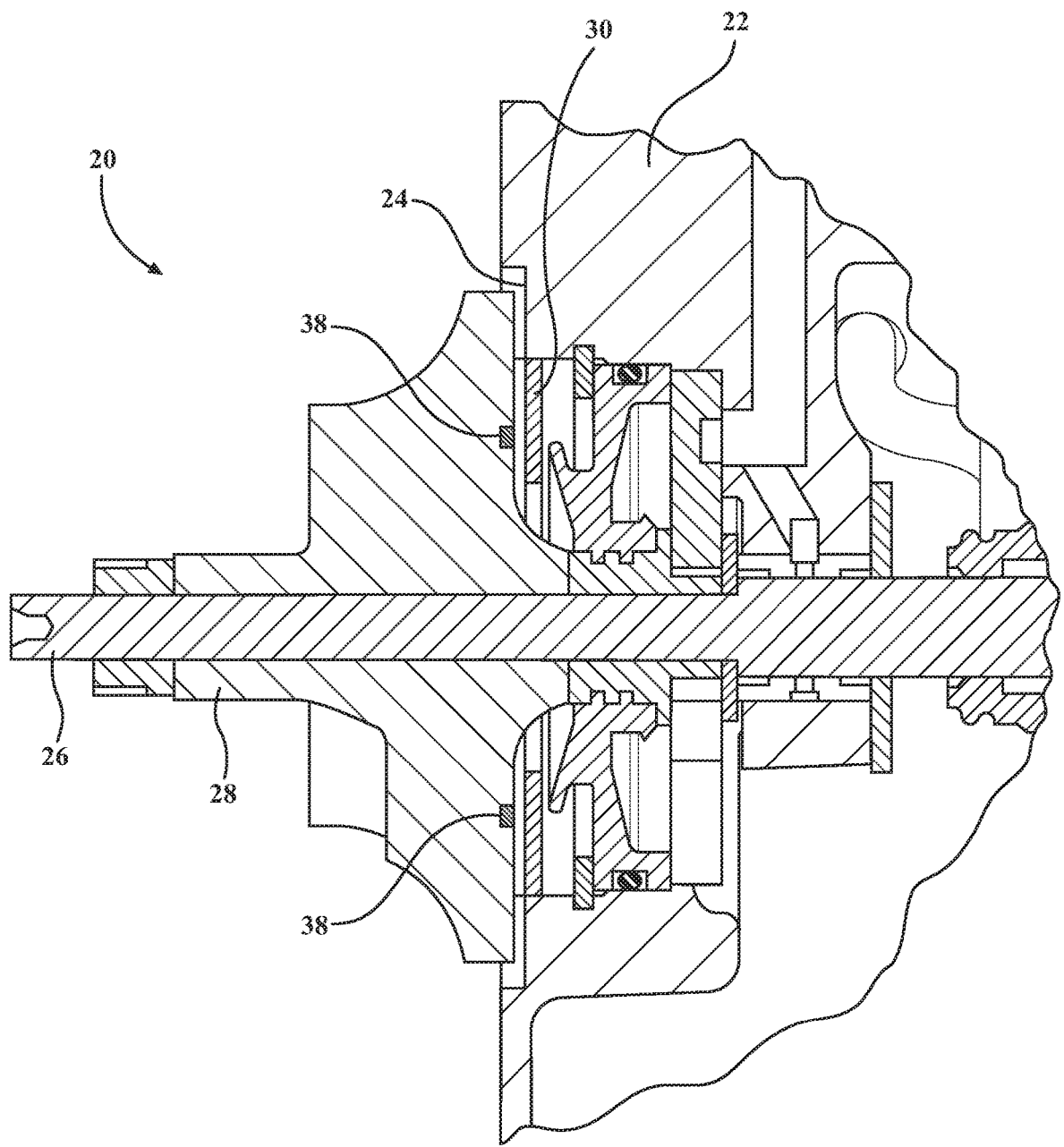
FIG. 13 is a close-up view of the impeller wheel, the backplate, the shaft, and the at least one target element of the rotating machine.

As shown in FIG. 12, the rotating machine 20 may include an electric assembly 56, with the electric assembly 56 including a rotor 58 coupled to the shaft 26 for rotating with the shaft 26, and a stator 60 disposed about the rotor 58. The electric assembly 56 may be configured as an electric motor, with the stator 60 configured to receive electrical energy to rotate the shaft 26 to rotate the impeller wheel 28. In such embodiments, electrical energy is supplied to the stator 60, which then increases rotational speed of the shaft 26 due to the rotor 58 being coupled to the shaft 26, which can deliver additional compressed air to an internal combustion engine. This may be referred to as an electric compressor, such as an eBooster®, as described above. The electric assembly 56 may be configured as a generator to produce electrical energy when the impeller wheel 28 rotates the shaft 26. In such embodiments, otherwise wasted energy, such as exhaust gas from an internal combustion engine, rotates the impeller wheel 28, which, in turn, rotates the shaft 26 and the rotor 58 within the stator 60 to produce electrical energy.

In one embodiment, the rotating machine 20 may be further defined as a turbocharger 62. It is to be appreciated that the description below of the rotating machine 20 being a turbocharger may equally apply to the rotating machine 20 including the electric assembly 56, such as an eBooster®. Namely, the description of the electric assembly 56 regarding the rotation of the shaft 26 in the turbocharger 62 equally applies to the electric assembly 56 regarding the rotation of the shaft 26 in the rotating machine 20, and the description of the compressor wheel 64 equally applies to the impeller wheel 28 of the rotating machine 20.

Figure 2:
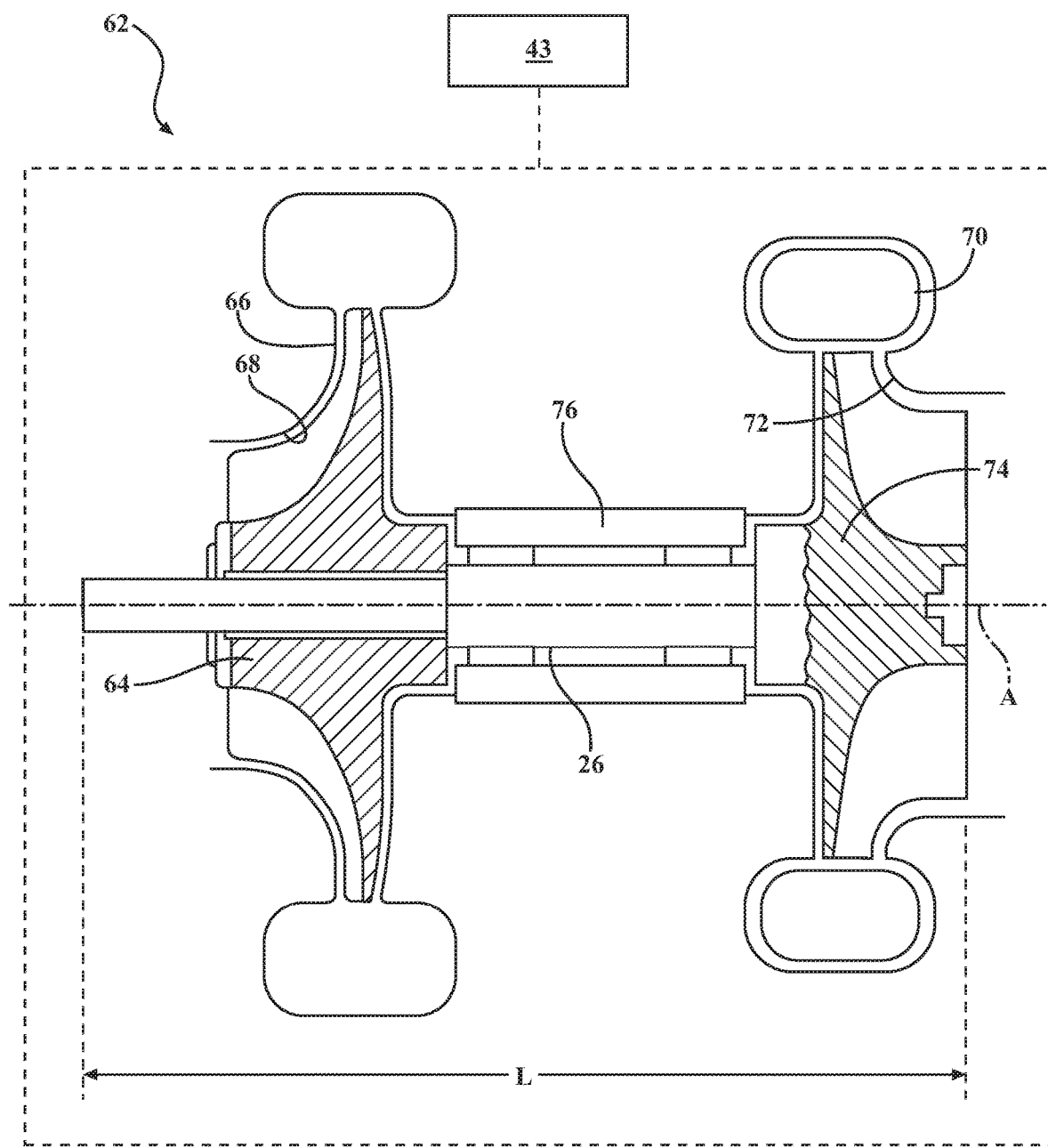
FIG. 2 is schematic illustration of the rotating machine being further defined as a turbocharger, with impeller wheel being further defined as a compressor wheel, the machine housing being further defined as a compressor wheel housing, and the housing interior being further defined as a compressor housing interior, and with the turbocharger including a turbine housing defining a turbine housing interior, a bearing housing defining a bearing housing interior, and a turbine wheel disposed within the turbine housing interior, with the turbocharger in communication with a controller.
Figure 14:
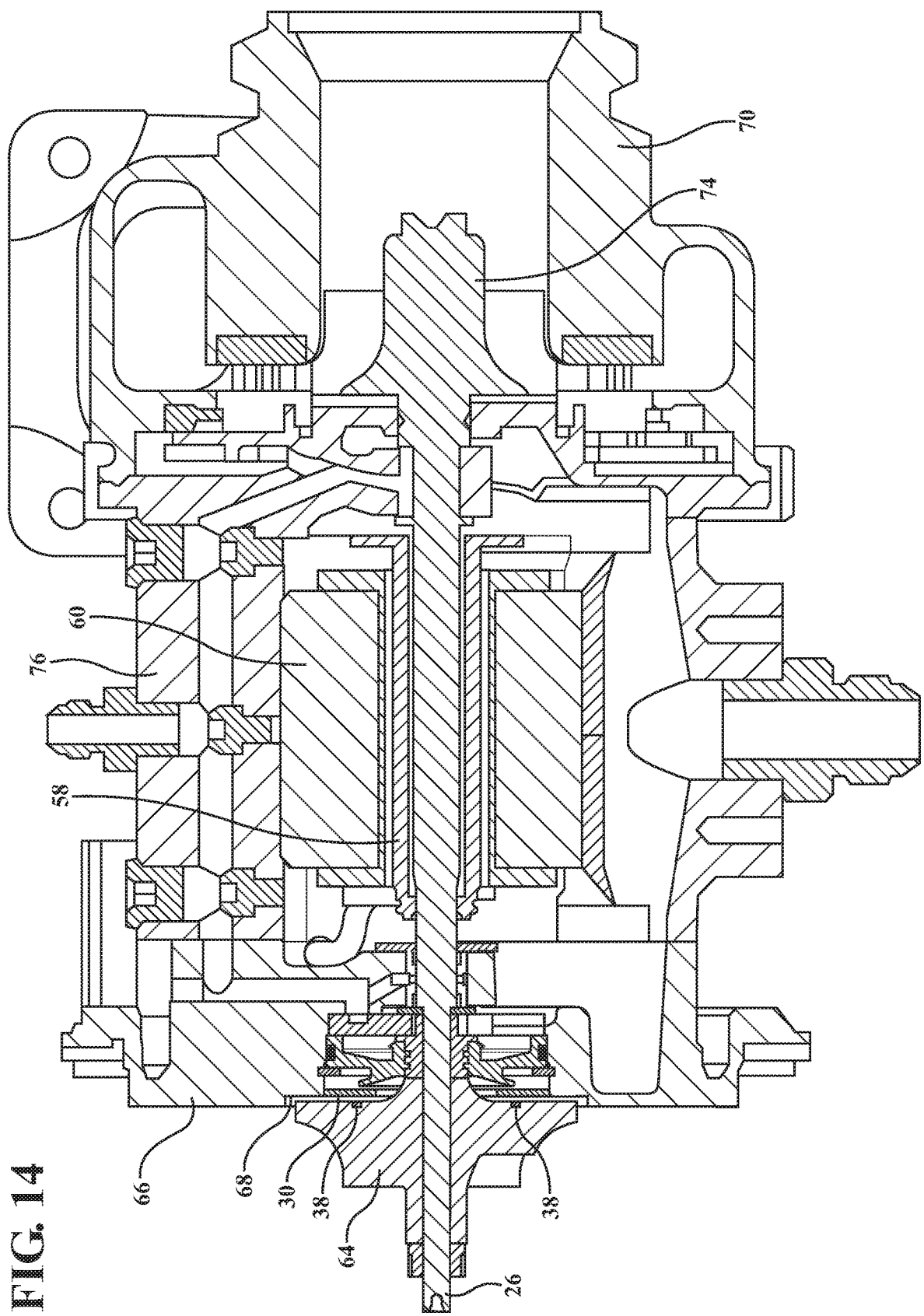
FIG. 14 is a cross-sectional view of the turbocharger including the electric assembly.

With reference to FIGS. 2 and 14, when the rotating machine 20 is a turbocharger 62, the impeller wheel 28 may be further defined as a compressor wheel 64, the machine housing 22 may be further defined as a compressor housing 66, and the housing interior 24 may be further defined as a compressor housing interior 68. The turbocharger 62 also includes a turbine housing 70 defining a turbine housing interior 72, a turbine wheel 74 disposed in the turbine housing interior 72 and coupled to and rotatable with the shaft 26, and a bearing housing 76 coupled to and disposed between the turbine housing 70 and the compressor housing 66. Typically, the at least one target element 38 is coupled to and rotatable with the compressor wheel 64, the circuit board 40 is coupled to the first side 32 of the backplate 30 and facing the compressor wheel 64, and the at least one sensor 42 disposed on the circuit board for detecting the at least one target element 38 to determine the angular position of the compressor wheel 64, as having the circuit board 40 coupled to the first side 32 of the backplate 30 and facing the compressor wheel 64 places the circuit board 40 in a region of the turbocharger 62 that sees reasonable cooling. As described above, the insulating plate 50 may be coupled to the circuit board 40 to help insulate the circuit board 40 from extreme temperatures, such as heat produced from exhaust gas of an internal combustion engine that is passed through the turbine wheel 74.

In one embodiment, the turbocharger 62 includes the electric assembly 56, with the rotor 58 coupled to the shaft 26 for rotating with the shaft 26, and a stator 60 disposed about the rotor 58. In such embodiments, the turbocharger 62 may be referred to as an electrically-assisted turbocharger. An electrically-assisted turbocharger may use the electric assembly 56 to assist in rotating the shaft 26 to provide a greater amount of compressed air to the internal combustion engine. Providing a greater amount of compressed air to the internal combustion engine by the electrically-assisted turbocharger reduces turbo-lag during lower RPMs of the internal combustion engine, allows a smaller internal combustion engine to be used and still have acceptable amounts of torque, increases fuel economy of the internal combustion engine, and is able to take energy from otherwise wasted exhaust gas and turn the thermal energy, into mechanical energy, and then into electrical energy.

When the turbocharger 62 is an electrically-assisted turbocharger, voltage of the stator 60 may be used to determine the angular position of the shaft 26. However, it is often difficult to accurately read the voltage in the stator 60 to determine the angular position of the compressor wheel 64 and hence the shaft 26. Specifically, during a startup of the turbocharger 62, determining the angular position of the compressor wheel 64 is an open loop control scheme until a threshold number of readings is obtained by the controller 43 from the voltage of the stator 60, which is then used to interpolate a theoretical compressor wheel angular position. In such applications, this may not only lead to an inaccurate compressor wheel angular position reading, but may also lead to a delay in desired operation of the turbocharger 62 because the controller 43 is unable to accurately control the current within the stator 60 to then control rotational speed of the shaft 26. As such, the at least one target element 38 coupled to and rotatable with the impeller wheel 28, the circuit board 40 coupled to the first side 32 of the backplate 30 and facing the impeller wheel 28, and the at least one sensor 42 disposed on the circuit board for detecting the at least one target element 38 may determine the angular position of the impeller wheel 28 independent of a voltage reading from the stator 60. Additionally, each shaft angular position reading obtained by the controller 43 is able to compare the actual angular shaft position reading with a predicted angular shaft position reading. After taking a number of readings, the delta between the actual angular compressor wheel position and the predicted angular compressor wheel position is reduced, which allows the controller 43 to more accurately interpolate the compressor wheel angular position and, in turn, the shaft angular position. Even if these readings are done in coarse increments, computational power of the controller 43 is significantly reduced and allows more complex regions of operation for the turbocharger 62.

Being able to determine the angular position of the impeller wheel 28 independent of the voltage reading from the stator 60 allows the controller 43 to accurately know the angular position of the compressor wheel 64 under all operating conditions, which then allows the controller 43 to apply the correct current to the stator 60 to achieve the desired performance of the turbocharger 62. Additionally, being able to determine the angular position of the compressor wheel 64 independent of the voltage reading from the stator 60 and independent of the rotational speed of the shaft 26 allows a closed loop control scheme. Specifically, the closed loop control scheme may be used over the entire operating range of the turbocharger 62, which decreases the processing power needed from the controller 43 and decreases the voltage needed from the controller 43, as the controller 43 does not have to switch between an open loop and a closed loop control scheme to interpolate the predicted compressor wheel angular position.

When the rotating machine 20 is a turbocharger 62, the impeller wheel 28 is often in a higher RPM range, such as 200,000 to 300,000 RPM, during operational demands that require more compressed air to be delivered to the internal combustion engine. When the shaft 26 is in a higher RPM range, there is a greater amount of current and voltage in the stator 60, which then makes it difficult determine the angular position of the compressor wheel 64 using the voltage of the stator 60 due to the magnetic saturation caused by the rotor 58 rotating within the stator 60. When the compressor wheel 64 is in a low RPM range, the stator 60 may only have millivolts to read with the controller 43, which is then difficult to obtain an accurate reading of the angular position of the shaft 26. As such, the at least one target element 38 coupled to and rotatable with the impeller wheel 28, the circuit board 40 coupled to the first side 32 of the backplate 30 and facing the impeller wheel 28, and the at least one sensor 42 disposed on the circuit board for detecting the at least one target element 38 to determine the angular position of the impeller wheel 28 independent of a voltage reading from the stator 60 and independent of rotational speed of the shaft 26 allows an accurate reading of the angular position of the compressor wheel 64 and, in turn, rotational speed of the shaft 26 over the entire operating range of the turbocharger 62.

Having the at least one target element 38 coupled to and rotatable with the impeller wheel 28, the circuit board 40 coupled to the first side 32 of the backplate 30 and facing the impeller wheel 28, and the at least one sensor 42 disposed on the circuit board for detecting the at least one target element 38 to determine the angular position of the impeller wheel 28 allows the controller 43 to use a field weakening algorithm, which allows the electric assembly 56 to be driven beyond its bus saturation level. When using the field weakening algorithm, the controller 43 is able to artificially change the electric field of the stator 60, which makes the stator 60 appear to have a higher voltage availability, which then allows the controller 43 to push the electric assembly 56 to be driven beyond its bus saturation limit to have a higher rotational speed of the shaft 26 than would be possible without the field weakening algorithm. When the field weakening algorithm is used by the controller 43, the magnetic field of the stator 60 is suppressed, which makes detecting the angular position of the shaft 26 using the voltage of the stator 60 inaccurate and makes it difficult to accurately predict the angular position of the impeller wheel 28. As such, having the at least one target element 38 coupled to and rotatable with the compressor wheel 64, the circuit board 40 coupled to the first side 32 of the backplate 30 and facing the impeller wheel 28, and the at least one sensor 42 disposed on the circuit board 40 for detecting the at least one target element 38 to determine the angular position of the impeller wheel 28 independent of a voltage reading of the stator 60 and independent of rotational speed of the shaft 26 allows the controller 43 to use a field weakening algorithm.

A method of obtaining the angular position of the impeller wheel 28 includes the steps of rotating the shaft and the impeller wheel 28 about the axis, sensing the at least one target element 38 rotating about the axis A with the at least one sensor 42 to obtain an impeller wheel 28 position reading, communicating the impeller wheel 28 position reading to the controller 43, and determining the angular position of the impeller wheel 28 based on the impeller wheel 28 position reading obtained by the at least one sensor 42 to determine the angular position of the impeller wheel 28. In one embodiment, the method of obtaining the angular position of the impeller wheel 28 wheel is completed without using a voltage reading of the stator 60 of the electric assembly 56. As described above, using the method of obtaining the angular position of the impeller wheel 28 allows the controller 43 to accurately know the angular impeller wheel position to apply the correct current to the stator 60, allows the controller 43 to know the angular position of the impeller wheel 28 independent of the voltage of the stator 60, and allows the controller 43 to use more complex operating conditions, such as field weakening, as less processing power is needed in the controller 43 to determine the angular position of the impeller wheel 28.

It is to be appreciated that the method of obtaining the angular position of the impeller wheel 28 may be applied to when the rotating machine 20 is the turbocharger 62 and when the impeller wheel 28 is the compressor wheel 64.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A rotating machine comprising:
   a machine housing defining a housing interior;
   a shaft disposed in said housing interior, with said shaft having a length and an axis extending along said length, and with said shaft being rotatable about said axis;
   an impeller wheel disposed in said housing interior and coupled to and rotatable by said shaft, with said impeller wheel having an angular position with respect to said axis;
   a backplate coupled to said machine housing and having a first side facing said impeller wheel and a second side opposite said first side and facing away from said impeller wheel;
   at least one target element coupled to and rotatable with said impeller wheel;
   a circuit board coupled to said first side of said backplate and facing said impeller wheel;
   at least one sensor disposed on said circuit board for detecting said at least one target element to determine said angular position of said impeller wheel; and
   a rotor coupled to said shaft for rotating with said shaft;
   wherein said backplate is disposed between said at least one target element and said rotor with respect to said axis.

2. The rotating machine as set forth in claim 1, wherein said at least one sensor is further defined as three sensors.

3. The rotating machine as set forth in claim 1, further comprising an insulating plate coupled to said circuit board and disposed between said circuit board and said backplate.

4. The rotating machine as set forth in claim 1 being free of a speed sensor.

5. A method of obtaining the angular position of the impeller wheel of claim 1, said method comprising the step of:
   rotating the shaft and the impeller wheel about the axis;
   sensing the at least one target element rotating about the axis with the at least one sensor to obtain an impeller wheel position reading;
   communicating the impeller wheel position reading to a controller; and
   determining the angular position of the impeller wheel based on the impeller wheel position reading obtained by the at least one sensor to determine the angular position of the impeller wheel.

6. The rotating machine as set forth in claim 1, wherein said at least one sensor is further defined as two sensors.

7. The rotating machine as set forth in claim 6, wherein said sensors are concentric and equally radially spaced about said axis.

8. The rotating machine as set forth in claim 1, wherein said at least one target element is further defined as two target elements.

9. The rotating machine as set forth in claim 8, wherein said target elements are concentric and equally radially spaced about said axis.

10. The rotating machine as set forth in claim 1, wherein said first side of said backplate has a first backplate surface defining a backplate cavity, and wherein said circuit board is disposed in said backplate cavity.

11. The rotating machine as set forth in claim 10, wherein said circuit board is flush with said first backplate surface.

12. The rotating machine as set forth in claim 1, further comprising a stator.

13. The rotating machine as set forth in claim 12, wherein said rotor and said stator are configured as an electric motor, and wherein said stator is configured to receive electrical energy to rotate said shaft to rotate said impeller wheel.

14. The rotating machine as set forth in claim 12, wherein said rotor and said stator are configured as a generator to produce electrical energy when said impeller wheel rotates said shaft.

15. The rotating machine as set forth in claim 12, wherein said stator is disposed about said rotor.

16. The rotating machine as set forth in claim 1 further defined as a turbocharger, wherein said impeller wheel is further defined as a compressor wheel, said machine housing is further defined as a compressor wheel housing, said housing interior is further defined as a compressor housing interior, and wherein said turbocharger comprises:
    a turbine housing defining a turbine housing interior;
    a turbine wheel disposed in said turbine housing interior and coupled to and rotatable with said shaft; and
    a bearing housing coupled to and disposed between said turbine housing and said compressor housing.

17. The rotating machine as set forth in claim 16 further comprising:
    a rotor coupled to said shaft for rotating with said shaft, and
    a stator disposed about said rotor.

18. A method of obtaining the angular position of the compressor wheel of claim 17, said method comprising the steps of:
    rotating the shaft and the compressor wheel about the axis;
    sensing the at least one target element rotating about the axis with the at least one sensor to obtain a compressor wheel position reading;
    communicating the compressor wheel position reading to a controller; and
    determining the angular position of the compressor wheel based on the compressor wheel position reading obtained by the at least one sensor to determine the angular position of the compressor wheel.

19. The method as set forth in claim 18, wherein the step of determining the angular position of the compressor wheel is completed without using a voltage reading of the stator.

20. A rotating machine comprising:
    a machine housing defining a housing interior;
    a shaft disposed in said housing interior, with said shaft having a length and an axis extending along said length, and with said shaft being rotatable about said axis;

an impeller wheel disposed in said housing interior and coupled to and rotatable by said shaft, with said impeller wheel having an angular position with respect to said axis;

a backplate coupled to said machine housing and having a first side facing said impeller wheel and a second side opposite said first side and facing away from said impeller wheel;

at least one target element coupled to and rotatable with said impeller wheel;

a circuit board coupled to said first side of said backplate and facing said impeller wheel; and at least one sensor disposed on said circuit board for detecting said at least one target element to determine said angular position of said impeller wheel;

wherein said impeller wheel has a backwall surface facing said first side of said backplate, and wherein said at least one target element is embedded in said backwall surface; and wherein said at least one target element has a target element surface facing said backplate, and wherein said target element surface of said target element is flush with said backwall surface.

\* \* \* \* \*